US011373466B2

(12) United States Patent
Golov (10) Patent No.: US 11,373,466 B2
(45) Date of Patent: Jun. 28, 2022

(54) DATA RECORDERS OF AUTONOMOUS VEHICLES

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 461 days.

(21) Appl. No.: 16/263,359

(22) Filed: Jan. 31, 2019

(65) Prior Publication Data

US 2020/0250901 A1    Aug. 6, 2020

(51) Int. Cl.
*G07C 5/08* (2006.01)
*B60R 21/0134* (2006.01)
*B60W 50/02* (2012.01)
*B60R 21/0136* (2006.01)

(52) U.S. Cl.
CPC .......... *G07C 5/085* (2013.01); *B60R 21/0134* (2013.01); *B60R 21/0136* (2013.01); *B60W 50/0205* (2013.01); *B60W 2050/0215* (2013.01)

(58) Field of Classification Search
CPC combination set(s) only.
See application file for complete search history.

(56) References Cited

U.S. PATENT DOCUMENTS

| 5,815,093 | A  | 9/1998 | Kikinis |
| 5,936,315 | A  | 8/1999 | Lais |
| 5,956,703 | A  | 9/1999 | Turner et al. |
| 6,345,219 | B1 | 2/2002 | Klemens |
| 6,629,030 | B2 | 9/2003 | Klausner et al. |
| 7,190,882 | B2 | 3/2007 | Gammenthaler |

(Continued)

FOREIGN PATENT DOCUMENTS

| CN | 1892705   | 1/2007 |
| CN | 101414388 | 4/2009 |

(Continued)

OTHER PUBLICATIONS

International Search Report and Written Opinion, PCT/US2020/015877, dated May 27, 2020.

(Continued)

*Primary Examiner* — Elaine Gort
*Assistant Examiner* — Anthony M Gartrelle
(74) *Attorney, Agent, or Firm* — Greenberg Traurig (57) ABSTRACT

Systems, methods and apparatus to collect sensor data generated in an autonomous vehicle. Sensors of the vehicle generate a sensor data stream that is buffered, in parallel and in a cyclic way, in a first cyclic buffer and a larger second cyclic buffer respectively. An advanced driver assistance system of the vehicle generates an accident signal when detecting or predicting an accident and provides a training signal when detecting a fault in object detection, recognition, identification or classification. The accident signal causes a sensor data stream segment to be copied from the first cyclic buffer into a slot of a non-volatile memory, selected from a plurality of slots in a round robin way. The training signal causes a sensor data stream segment to be copied from the second cyclic buffer into an area of the non-volatile memory outside of the slots reserved for the first cyclic buffer.

20 Claims, 4 Drawing Sheets

(56) References Cited

U.S. PATENT DOCUMENTS

| | | |
|---|---|---|
| 7,653,778 B2 | 1/2010 | Merry, Jr. et al. |
| 7,711,461 B2 | 5/2010 | Yokogawa |
| 8,010,248 B2 | 8/2011 | Sano |
| 8,060,718 B2 | 11/2011 | Freitas et al. |
| 8,090,495 B2 | 1/2012 | Fink et al. |
| 8,122,185 B2 | 2/2012 | Merry, Jr. et al. |
| 8,160,764 B2 | 4/2012 | Choi et al. |
| 8,312,207 B2 | 11/2012 | Merry, Jr. et al. |
| 8,321,084 B2 | 11/2012 | Yamashita et al. |
| 8,452,481 B2 | 5/2013 | Ishiko et al. |
| 8,527,778 B2 | 9/2013 | Kim |
| 8,531,793 B2 | 9/2013 | Bandic et al. |
| 8,688,915 B2 | 4/2014 | Daly et al. |
| 8,725,312 B2 | 5/2014 | Mori et al. |
| 8,793,431 B2 | 7/2014 | Bandic et al. |
| 8,930,625 B2 | 1/2015 | Daly et al. |
| 8,930,668 B2 | 1/2015 | Engle et al. |
| 8,959,280 B2 | 2/2015 | Yu et al. |
| 8,990,874 B2 | 3/2015 | Huang |
| 9,245,188 B2 | 1/2016 | Han |
| 9,298,603 B2 | 3/2016 | Schuette |
| 9,365,162 B2 | 6/2016 | Nix |
| 9,413,779 B2 | 8/2016 | Vasseur et al. |
| 9,450,978 B2 | 9/2016 | Vasseur et al. |
| 9,503,466 B2 | 11/2016 | Vasseur et al. |
| 9,521,158 B2 | 12/2016 | Di Pietro et al. |
| 9,563,854 B2 | 2/2017 | Cruz Mota et al. |
| 9,672,734 B1 | 6/2017 | Ratnasingam |
| 9,751,534 B2 | 9/2017 | Fung et al. |
| 9,802,541 B2 | 10/2017 | Nix |
| 9,947,145 B2 | 4/2018 | Wang et al. |
| 10,001,760 B1 | 6/2018 | Hoffmann et al. |
| 10,007,269 B1 | 6/2018 | Gray |
| 10,019,654 B1 | 7/2018 | Pisoni |
| 10,102,696 B2 | 10/2018 | Iwaasa |
| 10,214,213 B2 | 2/2019 | Kojima |
| 10,217,028 B1 | 2/2019 | Wang et al. |
| 10,229,547 B2 | 3/2019 | Isozaki et al. |
| 10,248,627 B2 | 4/2019 | Yang et al. |
| 10,254,760 B1 | 4/2019 | Abeloe |
| 10,296,004 B2 | 5/2019 | Nishi |
| 10,308,181 B2 | 6/2019 | Nix |
| 10,318,495 B2 | 6/2019 | Talagala et al. |
| 10,319,039 B1 | 6/2019 | Konrardy et al. |
| 10,365,835 B2 | 7/2019 | Monteleone et al. |
| 10,366,502 B1 | 7/2019 | Li |
| 10,386,792 B2 | 8/2019 | Blayvas |
| 10,423,358 B1 | 9/2019 | Foo |
| 10,427,655 B2 | 10/2019 | Nix |
| 10,459,444 B1 | 10/2019 | Kentley-klay |
| 10,521,976 B2 | 12/2019 | Shin et al. |
| 10,599,546 B1 | 3/2020 | Walther et al. |
| 10,611,379 B2 | 4/2020 | Olabiyi et al. |
| 10,614,639 B2 | 4/2020 | Iwaasa |
| 10,672,200 B2 | 6/2020 | Wang et al. |
| 10,678,244 B2 | 6/2020 | Iandola et al. |
| 10,713,955 B2 | 7/2020 | Tong et al. |
| 10,733,506 B1 | 8/2020 | Ogale et al. |
| 10,846,955 B2 | 11/2020 | Golov |
| 10,878,510 B2 | 12/2020 | Perl et al. |
| 10,994,741 B2 | 5/2021 | Zhou et al. |
| 11,094,148 B2 | 8/2021 | Sato |
| 11,120,353 B2 | 9/2021 | Olabiyi et al. |
| 11,188,821 B1 | 11/2021 | Kalakrishnan et al. |
| 2002/0107619 A1 | 8/2002 | Klausner et al. |
| 2002/0131768 A1 | 9/2002 | Gammenthaler |
| 2004/0113763 A1 | 6/2004 | Bendavid et al. |
| 2004/0263647 A1 | 12/2004 | Yamaguchi |
| 2005/0273218 A1 | 12/2005 | Breed et al. |
| 2006/0192658 A1 | 8/2006 | Yamamura |
| 2007/0132773 A1 | 6/2007 | Plante |
| 2008/0208533 A1 | 8/2008 | Yokogawa |
| 2008/0221751 A1 | 9/2008 | Fink et al. |
| 2008/0255723 A1 | 10/2008 | Sano |
| 2009/0105902 A1 | 4/2009 | Choi et al. |
| 2009/0240392 A1 | 9/2009 | Yamashita et al. |
| 2010/0030540 A1 | 2/2010 | Choi et al. |
| 2010/0060734 A1 | 3/2010 | Chou |
| 2010/0250061 A1 | 9/2010 | Toyofuku et al. |
| 2010/0256867 A1 | 10/2010 | Breuer et al. |
| 2010/0332072 A1 | 12/2010 | Ishiko et al. |
| 2011/0087893 A1 | 4/2011 | Kim |
| 2013/0041522 A1 | 2/2013 | Mori et al. |
| 2013/0097369 A1 | 4/2013 | Talagala et al. |
| 2013/0346350 A1 | 12/2013 | Subramanian et al. |
| 2014/0049646 A1* | 2/2014 | Nix .................... B60R 1/002 348/148 |
| 2014/0201126 A1 | 7/2014 | Zadeh et al. |
| 2014/0215119 A1 | 7/2014 | Fujii |
| 2014/0320655 A1 | 10/2014 | Kim |
| 2014/0320659 A1 | 10/2014 | Kaneyoshi |
| 2015/0100530 A1 | 4/2015 | Mnih et al. |
| 2015/0161454 A1 | 6/2015 | Han |
| 2015/0193693 A1 | 7/2015 | Vasseur et al. |
| 2015/0193694 A1 | 7/2015 | Vasseur et al. |
| 2015/0193695 A1 | 7/2015 | Cruz Mota et al. |
| 2015/0193696 A1 | 7/2015 | Vasseur et al. |
| 2015/0193697 A1 | 7/2015 | Vasseur et al. |
| 2015/0195145 A1 | 7/2015 | Di Pietro et al. |
| 2015/0195146 A1 | 7/2015 | Di Pietro et al. |
| 2015/0254555 A1 | 9/2015 | Williams, Jr. et al. |
| 2015/0324686 A1 | 11/2015 | Julian et al. |
| 2016/0020943 A1 | 1/2016 | Diab et al. |
| 2016/0078339 A1 | 3/2016 | Li et al. |
| 2017/0008168 A1 | 1/2017 | Weng et al. |
| 2017/0008521 A1 | 1/2017 | Braunstein et al. |
| 2017/0021835 A1 | 1/2017 | Kojima |
| 2017/0031906 A1 | 2/2017 | Yang et al. |
| 2017/0132527 A1 | 5/2017 | Ahn et al. |
| 2017/0148237 A1 | 5/2017 | Iwaasa |
| 2017/0169208 A1 | 6/2017 | Jantz et al. |
| 2017/0200284 A1 | 7/2017 | Lee et al. |
| 2017/0242436 A1 | 8/2017 | Creusot |
| 2017/0262735 A1 | 9/2017 | Ros Sanchez et al. |
| 2017/0278320 A1 | 9/2017 | Isozaki et al. |
| 2017/0293808 A1 | 10/2017 | Jain et al. |
| 2017/0305434 A1 | 10/2017 | Ratnasingam |
| 2018/0009330 A1 | 1/2018 | Ricci |
| 2018/0018775 A1 | 1/2018 | Piekniewski et al. |
| 2018/0025268 A1 | 1/2018 | Teig et al. |
| 2018/0027680 A1 | 1/2018 | Kumar et al. |
| 2018/0053071 A1 | 2/2018 | Chen et al. |
| 2018/0068206 A1 | 3/2018 | Pollach et al. |
| 2018/0082137 A1 | 3/2018 | Melvin et al. |
| 2018/0157920 A1 | 6/2018 | Hu |
| 2018/0164825 A1 | 6/2018 | Matus et al. |
| 2018/0173971 A1 | 6/2018 | Jia et al. |
| 2018/0174023 A1 | 6/2018 | Imam et al. |
| 2018/0174457 A1 | 6/2018 | Taylor |
| 2018/0188733 A1 | 7/2018 | Iandola et al. |
| 2018/0257643 A1* | 9/2018 | Kroop ................ B60W 30/09 |
| 2018/0285735 A1 | 10/2018 | Baum et al. |
| 2018/0292825 A1 | 10/2018 | Smolyanskiy et al. |
| 2018/0300816 A1 | 10/2018 | Perl et al. |
| 2018/0300964 A1 | 10/2018 | Lakshamanan et al. |
| 2019/0019082 A1 | 1/2019 | Dasgupta et al. |
| 2019/0034762 A1 | 1/2019 | Hashimoto |
| 2019/0035113 A1 | 1/2019 | Salvi et al. |
| 2019/0050624 A1 | 2/2019 | Chai et al. |
| 2019/0080526 A1 | 3/2019 | Shin et al. |
| 2019/0108651 A1 | 4/2019 | Gu et al. |
| 2019/0111876 A1 | 4/2019 | Siddiqui |
| 2019/0113927 A1 | 4/2019 | England et al. |
| 2019/0122109 A1 | 4/2019 | Busch et al. |
| 2019/0138889 A1 | 5/2019 | Jiang et al. |
| 2019/0146930 A1* | 5/2019 | Verhaeghe ............ G06F 12/123 |
| 2019/0147254 A1 | 5/2019 | Bai et al. |
| 2019/0147331 A1 | 5/2019 | Arditi |
| 2019/0163387 A1 | 5/2019 | Jin et al. |
| 2019/0187706 A1 | 6/2019 | Zhou et al. |
| 2019/0187707 A1 | 6/2019 | Zheng et al. |
| 2019/0197799 A1 | 6/2019 | Zwissler et al. |
| 2019/0204088 A1 | 7/2019 | Haque et al. |
| 2019/0205744 A1 | 7/2019 | Mondello et al. |

(56) References Cited

U.S. PATENT DOCUMENTS

| | | | |
|---|---|---|---|
| 2019/0205765 | A1 | 7/2019 | Mondello et al. |
| 2019/0251396 | A1 | 8/2019 | Geraci et al. |
| 2019/0258251 | A1 | 8/2019 | Ditty et al. |
| 2019/0287319 | A1 | 9/2019 | Golov |
| 2019/0299860 | A1 | 10/2019 | Nix |
| 2019/0302766 | A1* | 11/2019 | Mondello ............ G05D 1/0088 |
| 2019/0354838 | A1 | 11/2019 | Zhang et al. |
| 2019/0371087 | A1 | 12/2019 | Shin et al. |
| 2019/0385383 | A1 | 12/2019 | Sato |
| 2020/0068250 | A1 | 2/2020 | Bhooi et al. |
| 2020/0089580 | A1 | 3/2020 | Paley et al. |
| 2020/0111270 | A1 | 4/2020 | Sato |
| 2020/0118359 | A1 | 4/2020 | Sato |
| 2020/0175787 | A1* | 6/2020 | Gortsas .................. G07C 5/085 |
| 2020/0209810 | A1 | 7/2020 | Bazhenov et al. |
| 2020/0210336 | A1* | 7/2020 | Brautigam .......... G06F 12/0804 |
| 2020/0211304 | A1 | 7/2020 | Keum et al. |
| 2020/0250902 | A1 | 8/2020 | Golov |
| 2020/0257301 | A1 | 8/2020 | Weiser et al. |
| 2020/0279129 | A1 | 9/2020 | Batchelor et al. |
| 2020/0401136 | A1 | 12/2020 | Iandola et al. |
| 2021/0090356 | A1 | 3/2021 | Golov |
| 2021/0094587 | A1 | 4/2021 | Pilly et al. |
| 2021/0358234 | A1 | 11/2021 | Sato |

FOREIGN PATENT DOCUMENTS

| | | |
|---|---|---|
| CN | 102956045 | 3/2013 |
| CN | 103514645 | 1/2014 |
| CN | 104658056 | 5/2015 |
| CN | 205003749 | 1/2016 |
| GB | 2399247 | 9/2004 |
| JP | 2000-128030 | 5/2000 |
| JP | 2002118643 | 4/2002 |
| JP | 2002293271 | 10/2002 |
| JP | 2006-127206 | 5/2006 |
| JP | 2006127206 | 5/2006 |
| JP | 2007-280407 | 10/2007 |
| KR | 10-2007-0074388 | 7/2007 |
| KR | 20100057253 A | 5/2010 |
| KR | 10-1810539 | 12/2017 |
| WO | 2007037749 | 4/2007 |
| WO | 2008007878 A1 | 1/2018 |
| WO | 2019016114 A1 | 1/2019 |

OTHER PUBLICATIONS

Bojarski et al., "End to End Learning for Self-Driving Cars." arXiv:1604.07316v1, Apr. 25, 2016.

Fridman et al., "MIT Autonomous Vehicle Technology Study: Large-Scale Deep Learning Based Analysis of Driver Behavior and Interaction with Automation." arXiv:1711.06976v1, Nov. 19, 2017.

Pan et al., "Virtual to Real Reinforcement Learning for Autonomous Driving." arXiv:1704.03952v3, May 11, 2017.

Santana et al., "Learning a Driving Simulator." arXiv:1608.01230v1, Aug. 3, 2016.

Stem et al., "Dissipation of stop-and-go waves via control of autonomous vehicles: Field experiemnts." ARxIV:1705.01693V1, May 4, 2017.

Teichmann et al., "MultiNet: Real-time Joint Semantic Reasoning for Autonomous Driving." arXiv:1612.07695v1, Dec. 22, 2016.

International Search Report and Written Opinion, PCT/US2019/019562, dated Jun. 3, 2019.

International Search Report and Written Opinion, PCT/US2019/019651, dated Jun. 7, 2019.

U.S. Appl. No. 15/923,820, filed Mar. 16, 2018, Gil Golov, Notice of Allowance Mailed—Application Received in Office of Publications, dated Jul. 23, 2020.

U.S. Appl. No. 17/100,623, filed Nov. 20, 2020, Gil Golov, Application Undergoing Preexam Processing, Nov. 20, 2020.

U.S. Appl. No. 15/938,504, filed Mar. 28, 2018, Antonino Mondello et al., Final Rejection Mailed, dated Jul. 30, 2020.

U.S. Appl. No. 16/010,646, filed Jun. 18, 2018, Junichi Sato, Non Final Action Mailed, dated Feb. 13, 2020.

U.S. Appl. No. 15/858,143, filed Dec. 29, 2017, Antonino Mondello et al., Docketed New Case—Ready for Examination, Mar. 13, 2018.

U.S. Appl. No. 15/858,505, filed Dec. 29, 2017, Antonino Mondello et al., Docketed New Case—Ready for Examination, Mar. 13, 2018.

U.S. Appl. No. 16/263,403, filed Jan. 31, 2019, Gil Golov, Docketed New Case—Ready for Examination, Jun. 26, 2019.

Bin Yang, Ming Liang, Raquel Urtasun, "HDNET: Exploiting HD Maps for 3D Object Detection", Proceedings of The 2nd Conference on Robot Learning, PMLR 87:146-155, 2018.

Harsha Vardhan, "HD Maps: New age maps powering autonomous vehicles", https://www.geospatialworld.net/article/hd-maps-autonomous-vehicles/, Sep. 22, 2017.

International Search Report and Written Opinion, PCT/US2018/063669, dated Mar. 25, 2019.

Atoum, et al. "Monocular Video-Based Trailer Coupler Detection Using Multiplexer Convolutional Neural Network." IEEE International Conference on Computer Vision, Oct. 2017.

Chen, et al. "Brain-Inspired Cognitive Model with Attention for Self-Driving Cars." Feb. 18, 2017.

Eraqi, et al. "End-toEnd Deep Learning for Steering Autonomous Vehicles Considering Temporal Dependencies." 31st Conference on Neural Information Processing Systems, Nov. 22, 2017.

Extended European Search Report, EP19766799.1, dated May 7, 2021.

Hou, et al. "Fast Recurrent Fully Convolutional networks for Direct Perception in Autonomous Driving." Nov. 20, 2017.

Liu, et al. "A Unified Cloud Platform for Autonomous Driving." IEEE Computer Society, Dec. 18, 2017.

Pan, et al. "Agile Off-Road Autonomous Driving Using End-to-End Deep Imitation Learning." Sep. 21, 2017.

Sallab, et al. "Meta Learning Framework for Automated Driving." Jun. 11, 2017.

Shapiro, Danny. "Accelerating the Race to Autonomous Cars." Aug. 2016.

Wang, et al. "Reconfigurable Processor for Deep Learning in Autonomous Vehicles." International Telecommunication Union, Sep. 2017.

U.S. Appl. No. 15/923,820, filed Mar. 16, 2018, Gil Golov, Patented Case, Jan. 31, 2020.

U.S. Appl. No. 17/100,623, filed Nov. 20, 2020, Gil Golov, Docketed New Case—Ready for Examination, Aug. 21, 2021.

U.S. Appl. No. 15/938,504, filed Mar. 28, 2018, Antonino Mondello et al., Final Rejection Mailed, dated Dec. 9, 2021.

U.S. Appl. No. 16/010,646, filed Jun. 18, 2018, Junichi Sato, Patented Case, Feb. 8, 2021, U.S. Appl. No. 17/384,608, filed Jul. 23, 2021, Junichi Sato, Docketed New Case—Ready for Examination, Aug. 24, 2021.

U.S. Appl. No. 15/858,143, filed Dec. 29, 2017, Antonino Mondello et al., Non Final Action Mailed, dated Oct. 22, 2021.

U.S. Appl. No. 15/858,505, filed Dec. 29, 2017, Antonino Mondello et al., Notice of Allowance Mailed—Application Received in Office of Publications, dated Aug. 9, 2021.

U.S. Appl. No. 16/263,403, filed Jan. 31, 2019, Gil Golov, Docketed New Case—Ready for Examination, May 13, 2021.

Jin et al., "How to scale distributed deep learning?" arXiv1611.04581v1, Nov. 14, 2016.

Olabiyi et al., "Driver Action Prediction Using Deep (Bidirectional) Recurrent Neural Network." arXiv:1706.02257, Jun. 7, 2017.

Skende, Andi, "Introducing 'Parker' Next-Generation Tegra System-On-Chip." Aug. 2016.

Wu et al., "SqueezeDet: Unified, Small, Low Power Fully Convolutional Neural Networks for Real-Time Object Detection for Autonomous Driving." arXiv:1612.01051v3, Nov. 29, 2017.

Aljosa Osep, et al. "Large-Scale Object Discovery and Detector Adaptation from Unlabeled Video" arXiv:1712.08832v1, Dec. 23, 2017.

Chelsea Finn, et al. "Generalizing Skills with Semi-Supervised Reinforcement Learning." Conference paper at ICLR, 2017.

David Stavens, et al. "A Self-Supervised Terrain Roughness Estimator for Off-Road Autonomous Driving." arXiv:1206.6872, Jun. 27, 2012.

(56) References Cited

OTHER PUBLICATIONS

Evan Shelhamer, et al. "Loss is its own Reward: Self-Supervision for Reinforcement Learning." arXiv:1612.07307, Mar. 9, 2017.
Guy Rosman, et al. "Hybrid Control and Learning with Coresets for Autonomous Vehicles." IEEE/RSJ International Conference on Intelligent Robots and Systems (Iros), IEEE, Sep. 24-28, 2017.
Junhong Xu, et al. "Avoidance of Manual Labeling in Robotic Autonomous Navigation Through Multi-Sensory Semi-Supervised Learning." arXiv:1709.07911v3, Oct. 9, 2017.
Miguel A. Bautista, et al. "Learning Where to Drive by Watching Others." German Conference on Pattern Recognition, Aug. 15, 2017.
Mohammed Abdulla Yousuf, et al. U.S. "Systems and Methods for Safe and Reliable Autonomous Vehicles." Provisional U.S. Appl. No. 62/584,549, filed Nov. 10, 2017.
Xiaohang Zhan. "Mix-and-Match Tuning for Slef-Supervised Semantic Segmentation." Association for the Advancement of Artificial Intelligence (AAAI), 2018.
Kiran Zhong, et al. "Self-Supervised Learning for Stereo matching with Self-Improving Ability." arXiv:1709.00930v1, Sep. 4, 2017.

* cited by examiner

DATA RECORDERS OF AUTONOMOUS VEHICLES

RELATED APPLICATIONS

This application is related to U.S. patent application Ser. No. 16/263,403, filed Jan. 31, 2019 and entitled "Autonomous Vehicle Data Recorders," U.S. patent application Ser. No. 15/923,820, filed Mar. 16, 2018 and entitled "Black Box Data Recorder for Autonomous Driving Vehicle," U.S. patent application Ser. No. 15/938,504, filed Mar. 28, 2018 and entitled "Black Box Data Recorder with Artificial Intelligence Processor in Autonomous Driving Vehicle," U.S. patent application Ser. No. 16/010,646, filed Jun. 18, 2018 and entitled "Downloading System Memory Data in Response to Event Detection," U.S. patent application Ser. No. 15/858,143, filed Dec. 29, 2017 and entitled "Distributed Architecture for Enhancing Artificial Neural Network," and U.S. patent application Ser. No. 15/858,505, filed Dec. 29, 2017 and entitled "Self-Learning in Distributed Architecture for Enhancing Artificial Neural Network," the entire contents of which applications are incorporated herein by reference.

FIELD OF THE TECHNOLOGY

At least some embodiments disclosed herein relate to recording sensor data of autonomous vehicles for subsequent analyses, such as accident reviews and/or updating data, maps and artificial neural network models used by advanced driver assistance systems (ADAS).

BACKGROUND

Autonomous vehicles typically include many sensors to assist in controlling the operations of the autonomous vehicles. In the case of an accident, collision, or near collision involving an autonomous vehicle, there may be a benefit from reviewing the sensor data recorded just prior to and/or during the accident to assist in potentially determining the cause of the accident and/or whether there may have been a design flaw and/or a vehicle failure.

In the event of a power loss during the accident, vehicle sensor data stored in a volatile memory may be lost. A volatile memory requires power to maintain data stored therein. Examples of volatile memory include Dynamic Random-Access Memory (DRAM) and Static Random-Access Memory (SRAM).

Some memory integrated circuits are non-volatile and can retain stored data even when not powered for a long period of time (e.g., days, months, years). Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc.

Some non-volatile memories have useful service periods limited by the cycles of programming and erasing to store new data. A program erase (P/E) budget represents a predetermined number of cycles of programming and erasing that can be performed reliably for replacing data in an erasable medium. After the predetermined of cycles of erasure, the program erase (P/E) budget of such the erasable medium is used up; and as a result, the medium may become unreliable in a statistical sense and thus is considered at the end of its useful service life. For example, a single-level cell (SLC) flash memory can have a P/E budget near 100,000 cycles; a multi-level cell (MLC) flash memory can have a P/E budget ranging from 10,000 to 30,000 cycles; and a triple-level cell (TLC) or quad-level cell (QLC) flash memory can have a P/E budget between 3,000 to 5,000 cycles.

BRIEF DESCRIPTION OF THE DRAWINGS

The embodiments are illustrated by way of example and not limitation in the figures of the accompanying drawings in which like references indicate similar elements.

DETAILED DESCRIPTION

At least some embodiments disclosed herein provide systems, methods and apparatus to collect and store sensor data generated in an autonomous vehicle, or another vehicle with an advanced driver assistance system (ADAS), under different conditions and for different purposes.

In one example, after an accident (e.g., collision or near-collision) or a near accident event, the sensor data can be reviewed to determine the cause of the event. Such sensor data can be herein referred to as accident sensor data. The accident sensor data can be analyzed to, for example, identify the cause of the accident or near accident event and/or unsafe aspects or design of the autonomous vehicle. The analysis can lead to improved control designs and/or configurations for the safe operations of the autonomous vehicle and/or similar vehicles.

In another example, after the ADAS (e.g., autonomous driving system) of the vehicle detects a fault/error in processing the sensor data, or a mismatch in identifying an object from the sensor data, or a failure to identify/classify an object from the sensor data, or a failure to recognize, detect, identify or classify an object with a minimum confidence level, the sensor data can be used to improve the advanced driver assistance system (ADAS). Such sensor data not associated with an accident or a near accident event can be herein referred to as training sensor data. The improvement can be made, for example, through performing machine learning using the sensor data and/or updating the data model(s) used in the ADAS to classify or identify an object. Such data models can include a high definition (HD) map of a road system in which the autonomous vehicle travels and/or an artificial neural network used for object detection, classification, recognition, and/or identification.

A high definition (HD) map is typically used in an autonomous vehicle for motion planning. Such a map can have high precision at centimeter level. The HD map can provide geometric and semantic information about the environment (e.g., a road system) in which the vehicle operates. Geometric information provided in the HD map can include raw sensor data collected by light detection and ranging (lidar), radar, camera, sonar, GPS, etc. Semantic information can identify objects, such as lane boundaries, intersections, parking spots, stop signs, traffic lights, and other information, such as traffic speeds, lane change restrictions, etc.

Some techniques have been developed to further use the HD map to generate representations/inputs for object detection, classification, identification and/or recognition performed using an artificial neural network (ANN).

Objects identified in the HD map can be compared with objects identified via sensor data generated by digital cameras, lidar (light detection and ranging), radar (radio detection and ranging), ultrasound sonar (sound navigation and ranging), etc. When there is a mismatch in object detection, classification, recognition, or identification, the sensor data can be used in an analysis to update the HD map and/or train the artificial neural network (ANN) used for object detection, classification, recognition, or identification.

In some embodiments disclosed herein, a data recorder of an autonomous vehicle is configured with two separate cyclic buffers for buffering accident sensor data for subsequent accident review and for buffering training sensor data for improving ADAS (e.g., an HD map and/or an ANN model). The separate cyclic buffers can be separately configured to meet the different requirements for buffering sensor data for different usages (e.g., accident review and ADAS improvement). In other embodiments disclosed herein, a single cyclic buffer is controlled by a controller to meet the different requirements for the two separate cyclic buffers.

For example, the data recorder can be configured with an accident data cyclic buffer to buffer accident sensor data for subsequent accident review and a training data cyclic buffer to buffer training sensor data for improving ADAS.

For example, the data recorder can receive a data stream containing live video data from various cameras mounted on the vehicle and various output signals from the other sensors, such as radar, lidar, ultrasound sonar, etc. The sensor data can be raw data from the sensors or compressed image/video data.

Each of the cyclic buffers is configured to buffer data cyclically, where incoming data is filled into the buffer until the buffer is full, and then further new data is buffered to replace the oldest data in the cyclic buffer. The cyclic buffer can be implemented using a type of memory that has very high endurance (e.g., allowing hundreds of petabytes of data to be written and rewritten in the cyclic buffer). For example, the cyclic buffer can be implemented via SRAM or DRAM that are volatile and require power to retain its content. Alternatively, the cyclic buffer can be implemented using a non-volatile memory that has very high endurance, such as a cross point memory.

A cross point memory uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

Some non-volatile memory that has very high endurance suffers from short data retention (e.g. minutes or hours).

The autonomous vehicle can be configured to generate a signal indicating the occurrence of an accident or a prediction of a potential accident. Such a signal can be herein referred to as an accident signal.

An accident signal can be generated by the ADAS (e.g., autonomous driving system) based on sensor data. For example, an activation of the automatic emergency braking can cause the generation of an accident signal for the data recorder. For example, an activation of the anti-lock braking system can cause the generation of an accident signal to the data recorder. For example, accelerating faster than a threshold can cause the generation of an accident signal to the data recorder. For example, when a collision avoidance system of the vehicle detects an impact threat, or determines that the probability of an impact is above a threshold, an accident signal can be generated for the data recorder. For example, when airbag sensors determine that a collision is occurring during the initial impact of a crash, an accident signal can be generated for the data recorder. For example, when the ADAS detects from the sensor data a dangerous scenario, such as another car or object is closer than a threshold to the autonomous vehicle, an accident signal is generated for the data recorder.

The data recorder of the vehicle is configured to have a non-volatile memory. The non-volatile memory of the data recorder can be implemented using a high density and high data retention flash memory that can retain data for months and/or years without being powered. For example, a triple-level cell (TLC), or quad-level cell (QLC) NAND flash memory can be used as the non-volatile memory of the data recorder.

In response to the accident signal, the data recorder copies the content of the accident data cyclic buffer into the non-volatile memory such that the accident sensor data can be preserved after the accident, which may prevent the data recorder from being powered for a long period of time.

Preferably, the non-volatile memory of the data recorder is configured to include a number of slots for accident sensor data. Each of the slots is a dedicated storage space for saving the sensor data copied from the accident data cyclic buffer. In response to each accident signal, the content of the accident data cyclic buffer is copied into an available one of the slots in the non-volatile memory. Initially, all of the slots are available for storing sensor data copied from the accident data cyclic buffer. After all the slots have been used in response to past accident signals, the slot storing the sensor data associated with the oldest accident signal is made available to store the new, current sensor data copied from the accident data cyclic buffer in response to the current accident signal.

The data recorder is configured to ensure the completion of the copying of sensor data from the accident data cyclic buffer to the non-volatile memory, even when the accident causes disruption in power supply to the data recorder. For example, the data recorder can have a backup power source that is sufficient to power the operations to complete the copying of sensor data from the accident data cyclic buffer to the non-volatile memory, even when the external power supply to the data recorder is removed immediately after the accident signal. The backup power source can be implemented via a capacitor that is charged to store power for the operations while the data recorder is powered normally via an external power supply (e.g., during the operation of recording data in the accident data cyclic buffer before the accident). Alternatively, or in combination, the backup power source can include a battery mounted within the housing of the data recorder.

The accident data cyclic buffer is configured to buffer sensor data for a period of time (e.g., 30 seconds) immediately before the accident signal. In response to the accident signal, the sensor data buffered for this period of time is copied into a slot in the non-volatile memory of the data recorder; and before the respective data is copied into the slot, the existing data in the accident data cyclic buffer at the time of the accident signal is not overwritten with new data from the sensors.

In one implementation, in response to the accident signal, the accident data cyclic buffer temporarily stops buffering incoming new sensor data to preserve its content and resumes buffering data after at least an oldest portion of the content in the accident data cyclic buffer has been copied into the slot in the non-volatile memory of the data recorder. Optionally, the accident data cyclic buffer can resume buffering of incoming new sensor data after the completion of storing the existing data for the accident signal into the non-volatile memory. Optionally, the accident data cyclic buffer can resume buffering of incoming new sensor data after a predetermined portion of the content of the accident data cyclic buffer has been copied into a slot in the non-volatile memory and before the entire content of the accident data cyclic buffer is copied into the slot, where buffering of incoming new sensor data does not write over the accident sensor data to be copied to the non-volatile memory of the data recorder.

In another implementation, in response to the accident signal, the accident data cyclic buffer is configured to read an oldest portion of the content in the accident data cyclic buffer for recording in the non-volatile memory and then record the incoming new sensor data in place to overwrite the oldest portion in the accident data cyclic buffer. Thus, the data recorder vacates the content from the accident data cyclic buffer into a slot in the non-volatile memory while continuing recording the incoming sensor data in the portion of the vacated portion of the accident data cyclic buffer; and the data recorder can continue buffering incoming sensor data, without failing to buffer any incoming sensor signal, while copying the content associated with the accident signal (e.g., generated during the 30 second time period immediately before the accident signal) into a slot in the non-volatile memory.

Optionally, the data recorder and/or the autonomous vehicle can be configured to upload the data content from the slots in the non-volatile memory to a remote server through a communication network/connection. For example, the data transfer can be configured to perform in one of several options. One option is to wirelessly transmit the data via a cellular communications network to the server. Another option is to wirelessly transmit the data to the server via a wireless local area network (e.g., Wi-Fi). A further option is to transmit through a wired connection over a diagnosis port of the autonomous vehicle. A yet another option is to remove the data recorder from the autonomous vehicle for a wired connection to a communication port of the data recorder.

The accident sensor data recorded in the slots of the non-volatile memory of the data recorder can be used in the investigation of the accidents or near accident events.

The autonomous vehicle can generate a signal indicating the request to save sensor data for training and/or improving ADAS. Such a signal can be herein referred to as a training signal.

For example, the training signal can be generated by the ADAS (e.g., autonomous driving system) in response to a mismatch between road objects identified in the HD map (e.g., lane boundaries, obstacles, traffic signs, etc.) and the corresponding objects detected or recognized from the sensor data. The sensor data associated with the mismatch can be used to train the ADAS in recognizing the objects and/or updating the HD map for the corresponding segment of the road.

The training data cyclic buffer is configured to buffer training sensor data in parallel with the accident data cyclic buffer buffering accident sensor data. The training data cyclic buffer is configured to have a capacity to store data collected in a longer period of time (e.g., 3 minutes) than the accident data cyclic buffer (e.g., 30 seconds).

Responsive to a training signal, training sensor data is copied from the training data cyclic buffer into the non-volatile memory of the data recorder. The training sensor data being copied responsive to the training signal can include a portion that is generated prior to the training signal and a remaining portion that is generated after the training signal. In some instances, the portion generated prior to the training signal is for a time period equal to or longer than the length of the stream segment buffered in the accident data cyclic buffer (e.g., 30 seconds or more). In other instances, the entire training sensor data being copied responsive to the training signal is generated before the training signal. Optionally, a time period selection indication is provided with the training signal, such that the data recorder can selectively copy the portion generated prior to the training signal and the remaining portion generated after the training signal. Alternatively, the ADAS can select the time period by adjusting the timing of the training signal such that a time window predefined relative to the training signal is the time period of the sensor data stream segment that is to be saved as the training sensor data. In some instances, upon receiving the training signal in the data recorder, the training data cyclic buffer continues buffering incoming sensor data signal until the remaining portion, generated after the training signal, is buffered in the training data cyclic buffer for copying into the non-volatile memory of the data recorder. Optionally, the training data cyclic buffer may temporarily stop buffering further incoming sensor data after the remaining portion that is generated after the training signal is buffered in the training data cyclic buffer and before the completion of copying the training sensor data associated with the training signal to the non-volatile memory of the data recorder. The copying of the training sensor data can be configured to start in response to the training signal and before the completion of the buffering the entire training sensor data associated with the training signal. Alternatively, the copying of the training sensor data can be configured to start upon or after the completion of the buffering the entire training sensor data associated with the training signal.

Preferably, the non-volatile memory of the data recorder is configured to have a dedicated area reserved to store training sensor data. The training data area in the non-volatile memory is separate from the slots configured for sensor data for accident reviews.

Optionally, the training data area can have multiple slots for storing training sensor data associated with multiple training signals. The data recorder can be configured to retain the training sensor data associated with the latest training signals.

Optionally, the data recorder is further configured to receive priority indication of the training signals. For example, the ADAS can evaluate a degree of mismatch between the object identified in the HD map and the corresponding object detected/recognized from the sensor data. A high degree of mismatch is assigned a high priority. Similarly, a low confidence level in detecting, classifying, recognizing or identifying an object can be assigned a high priority. Thus, the data recorder can be configured to retain the training sensor data based on the priority indications when the data recorder has insufficient slots to store training data that have not yet been transmitted to a server.

The content copied into the training data area of the non-volatile memory of the data recorder can be transmitted automatically to a remoter server via some of the communication options discussed above for the transmission of accident data, such as a wireless cellular communication network (e.g., 5G cellular communication) and/or a wireless local area network (e.g., Wi-Fi). Depending on the network bandwidth and coverage, the data transmission may take a time period from minutes to hours/days. The non-volatile memory of the data recorder can retain the data without power before the completion of the data transmission.

Figure 1:
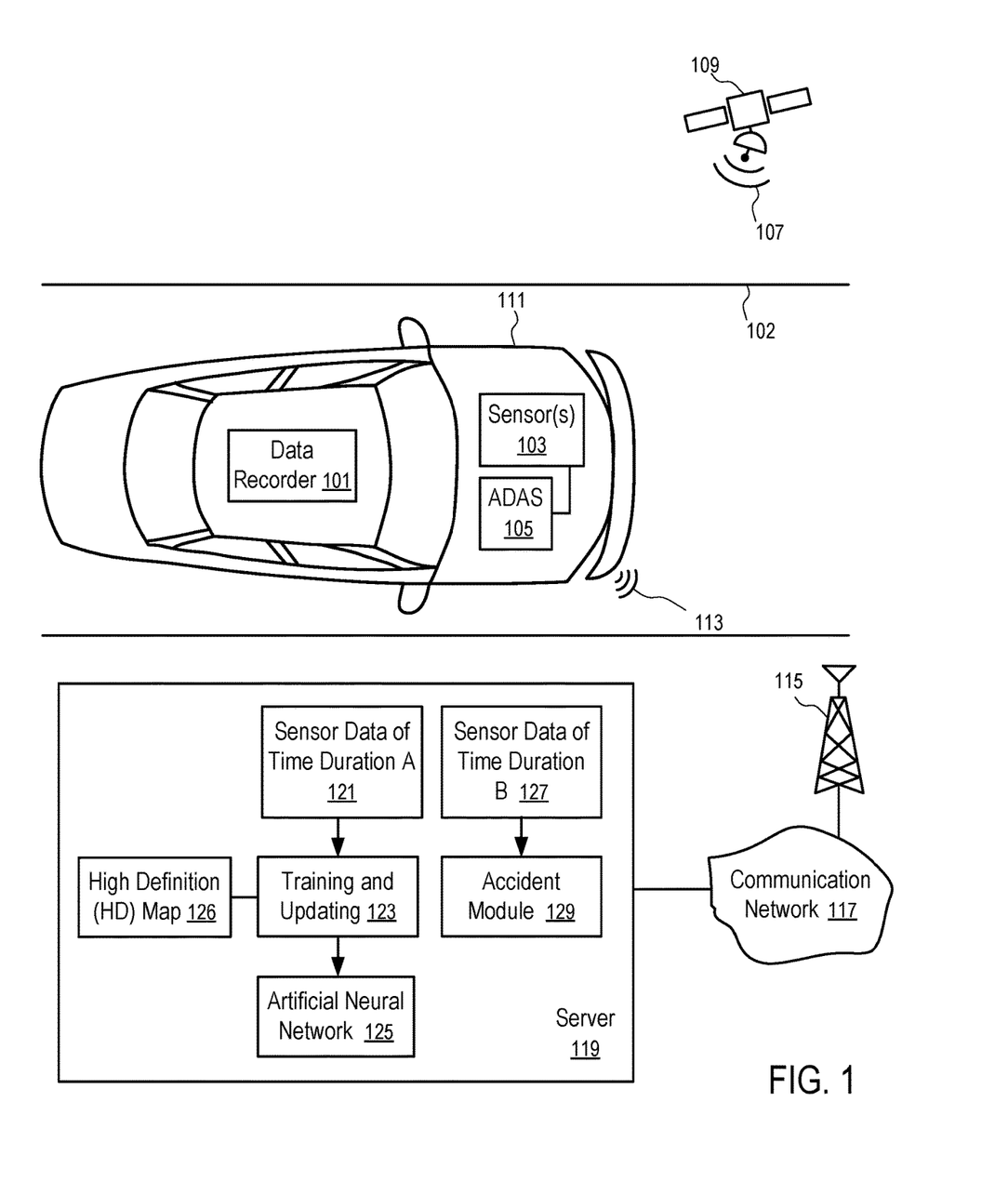
FIG. 1 shows a system in which a vehicle is configured with a data recorder to collect sensor data for improving its advanced driver assistance systems (ADAS) and/or for accident review.

FIG. 1 shows a system in which a vehicle is configured with a data recorder to collect sensor data for improving its advanced driver assistance systems (ADAS) and for accident review.

The system of FIG. 1 includes a vehicle (111) having a data recorder (101). The data recorder (101) can be configured according to any of the embodiments disclosed herein. The vehicle (111) has an advanced driver assistance system (ADAS) (105) and one or more sensors (103) that provide sensor data input to the ADAS (105).

For example, the sensor(s) (103) can include digital cameras, lidars, radars, ultrasound sonars, brake sensors, speed sensors, acceleration sensors, airbag sensors, a GPS (global positioning system) receiver, etc.

The outputs of the sensor(s) (103) as a function of time are provided as a sensor data stream to the ADAS (105) to support its operations and to the data recorder (101) for buffering and/or recording. The ADAS (105) can generate accident signals and/or training signals to initiate the transfer of sensor data from the cyclic buffers to the non-volatile memory of the data recorder (101), as discussed above.

For example, in response to the detection of an accident or a near accident event, the ADAS (105) can generate an accident signal to cause the data recorder (101) to store accident sensor data (e.g., 127) of a time duration B (e.g., 30 seconds). The accident sensor data (127) is typically generated by the sensor(s) in the time duration B (e.g., 30 seconds) and buffered in a cyclic buffer of the data recorder (101) prior to the accident signal generated by the ADAS (105).

For example, in response to the detection of an opportunity to train or improve the ADAS (105) that is other than an accident or a near accident event, the ADAS (105) can generate a training signal to cause the data recorder (101) to store training sensor data (e.g., 121) of a time duration A (e.g., 3 minutes). The training sensor data (121) is generated by the sensor(s) in the time duration A (e.g., 3 minutes) and buffered in a cyclic buffer of the data recorder (101). The time duration A (e.g., 3 minutes) can include a portion that is before a training signal generated by the ADAS (105) and optionally a portion that is after the training signal.

The vehicle (111) is configured with a wireless communication device to transmit, via wireless signals (113) and a communication network (117) to a remote server (119), the accident sensor data (127) and/or the training sensor data (121). The remote server (119) is typically configured at a location away from a road (102) on which the vehicle (111) is in service. One example of the communication network (117) is a cell phone network having one or more base stations (e.g., 115) to receive the wireless signals (e.g., 113). Another example of the communication network (117) is internet, where the wireless local area network signals (e.g., 113) transmitted by the vehicle (111) is received in an access point (e.g., 115) for further communication to the server (119). In some implementations, the vehicle (111) uses a communication link (107) to a satellite (109) or a communication balloon to transmit the sensor data (e.g., 121 or 127) to the server (119).

The server (119) can be configured to include an accident module (129). The accident sensor data (127) can be reviewed and/or analyzed in the accident module (129) to identify the cause of the accident and/or possible design or configuration changes to improve autonomous driving and/or the ADAS.

The server (119) can be configured to include a training and updating module (123). The training sensor data (121) can be used in the training and updating module (123) to improve the artificial neural network (ANN) (125) of the ADAS (105) and/or to update the high definition (HD) map (126) of the road (102) used by the vehicle (111).

In some implementations, the ADAS (105) can optionally include a machine learning module that is configured to use the training sensor data (121) stored in the non-volatile memory of the data recorder (101) to improve its ANN, with or without assistance from the server (119).

Figure 2:
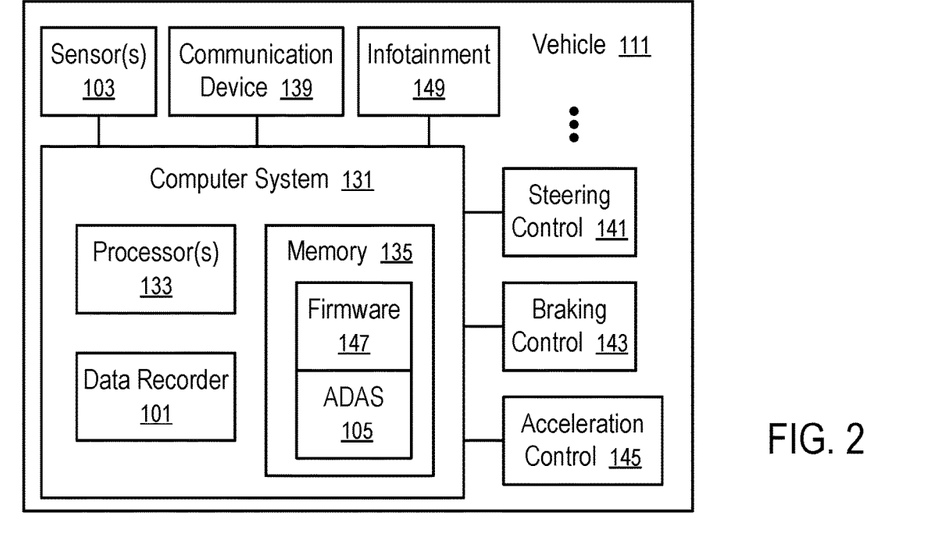
FIG. 2 shows an autonomous vehicle having a data recorder according to one embodiment.

FIG. 2 shows an autonomous vehicle (111) having a data recorder (101) according to one embodiment. For example, the vehicle (111) in the system of FIG. 1 can be implemented using the autonomous vehicle (111) of FIG. 2.

The vehicle (111) of FIG. 2 is configured to have an advanced driver assistance system (ADAS) (105). The ADAS (105) of the vehicle (111) can have a high definition (HD) map (126) for motion planning and an Artificial Neural Network (ANN) (125) for object detection, recognition, identification, and/or classification. Optionally, the HD map (126) can also be used in object detection, recognition, identification, and/or classification.

When there is a mismatch between an object identified in the HD map (126) and the identification of the object via the ANN (125), the ADAS (105) can generate a training signal for the data recorder (101).

When the ADAS (105) detects an accident or a near accident event, the ADAS (105) can generate an accident signal for the data recorder (101).

The vehicle (111) typically includes an infotainment system (149), a communication device (139), one or more sensors (103), and a computer system (131) that is connected to some controls of the vehicle (111), such as a steering control (141) for the direction of the vehicle (111), a braking control (143) for stopping of the vehicle (111), an acceleration control (145) for the speed of the vehicle (111), etc. In some embodiments, the vehicle (111) in the system of FIG. 1 has a similar configuration and/or similar components.

The computer system (131) of the vehicle (111) includes one or more processors (133), a data recorder (101), and memory (135) storing firmware (or software) (147), including the computer instructions and data models for ADAS (105). The data models of the ADAS (105) can include the HD map (126) and the ANN (125).

The one or more sensors (103) can include a visible light camera, an infrared camera, a lidar, radar, or sonar system, a peripheral sensor, a global positioning system (GPS) receiver, a satellite positioning system receiver, a brake sensor, and/or an airbag sensor. The sensor(s) can provide a stream of real time sensor data to the computer system (131). The sensor data generated by a sensor (103) of the vehicle can include an image that captures an object using a camera that images using lights visible to human eyes, or a camera that images using infrared lights, or a sonar, radar, or LIDAR system. Image data obtained from at least one sensor of the vehicle is part of the collected sensor data for recording in the data recorder.

The outputs of the ADAS (105) can be used to control (e.g., (141), (143), (145)) the acceleration of the vehicle (111), the speed of the vehicle (111), and/or the direction of the vehicle (111), during autonomous driving.

In some embodiments, after the server (119) updates the ANN (125) and/or the HD map (126), the server (119) can update the ADAS of the vehicle (111) over the air by downloading the ANN (125) and/or the HD map (126) to the computer system (131) of the vehicle (111) through the communication device (139) and/or wireless signals (113).

Figure 3:
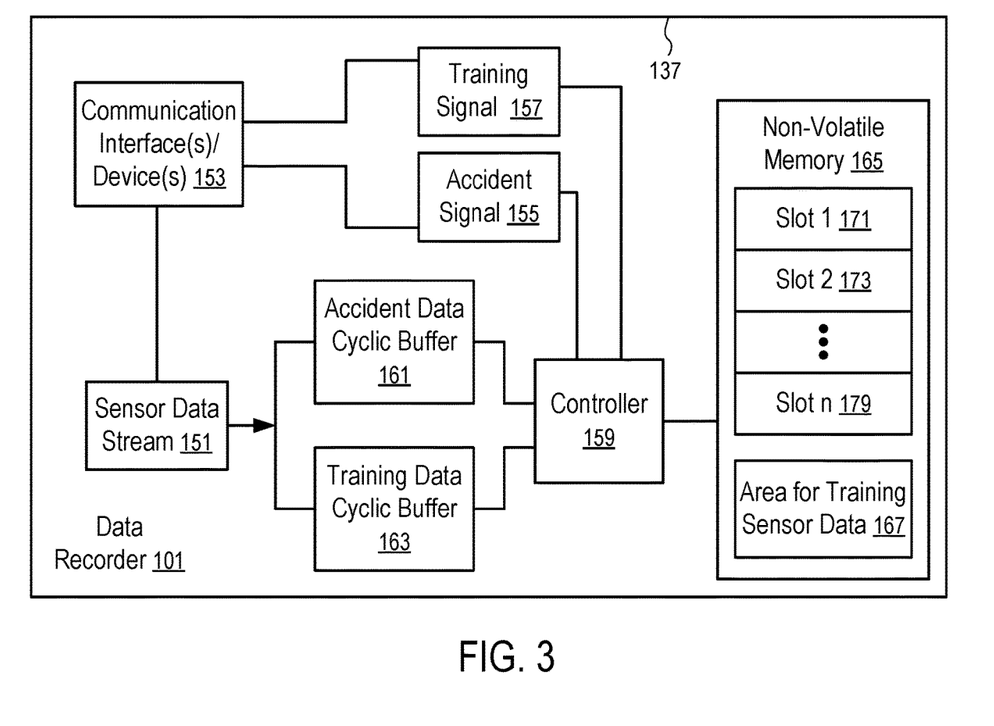
FIG. 3 shows a data recorder according to one embodiment.

FIG. 3 shows a data recorder according to one embodiment. For example, the data recorder (101) in the system of FIG. 1 and/or in the vehicle (111) of FIG. 2 can be implemented using the data recorder (101) of FIG. 3.

The data recorder (101) of FIG. 3 can include a housing (137) that encloses its components. Optionally, the housing (137) of the data recorder (101) seals the components of the data recorder (101) and protects the data recorder (101) and/or the data stored in the non-volatile memory (165) from destruction during an accident; and thus, the data stored in the non-volatile memory (165) of the data recorder (101) can be retrieved after an impact/collision, a fire, and/or a flood that is typical in an accident involving a vehicle.

The data recorder (101) of FIG. 3 includes one or more communication interfaces or devices (153), an accident data cyclic buffer (161), a training data cyclic buffer (163), a controller (159), and a non-volatile memory (165).

The communication interface(s) or device(s) (153) can be used to receive a sensor data stream (151) from the sensor(s) (103) of the vehicle (111) in which the data recorder (101) is installed. The sensor data stream (151) is provided to the accident data cyclic buffer (161) and the training data cyclic buffer (163) in parallel.

Further, communication interface(s) or device(s) (153) can be used to receive training signals (e.g., 157) and accident signals (155) from the vehicle (111) and/or its ADAS (105).

In response to an accident signal (155), the controller (159) stops recording the incoming sensor data stream (151) into the accident data cyclic buffer (161) and starts copying the content from the accident data cyclic buffer (161) to the non-volatile memory (165).

The non-volatile memory (165) has multiple slots (171, 173, ..., 179). Each of the slots is sufficient to store the entire content of the accident data cyclic buffer (161). The controller (159) can use the slots (171, 173, ..., 179) in a round robin way and/or in a cyclic way such that after a number of accident signals, the slots (171, 173, ..., 179) stores the latest set of accident sensor data associated with and/or identified by the most recent accident signals.

In response to a training signal (157), the controller (159) can continue the buffering of the incoming sensor data stream (151) into the training data cyclic buffer (163) such that the training data cyclic buffer (163) contains a training sensor data set that is partially recorded before the training signal (157) and partially recorded after the training signal (157). The controller (159) then copies the training sensor data set into the area (167) reserved in the non-volatile memory (165) for training sensor data.

Optionally, the area (167) can also include multiple slots, each being sufficient to store the content of the training data cyclic buffer (163).

Optionally, the data recorder (101) includes a backup power source, such as a capacitor or a rechargeable battery.

Figure 4:
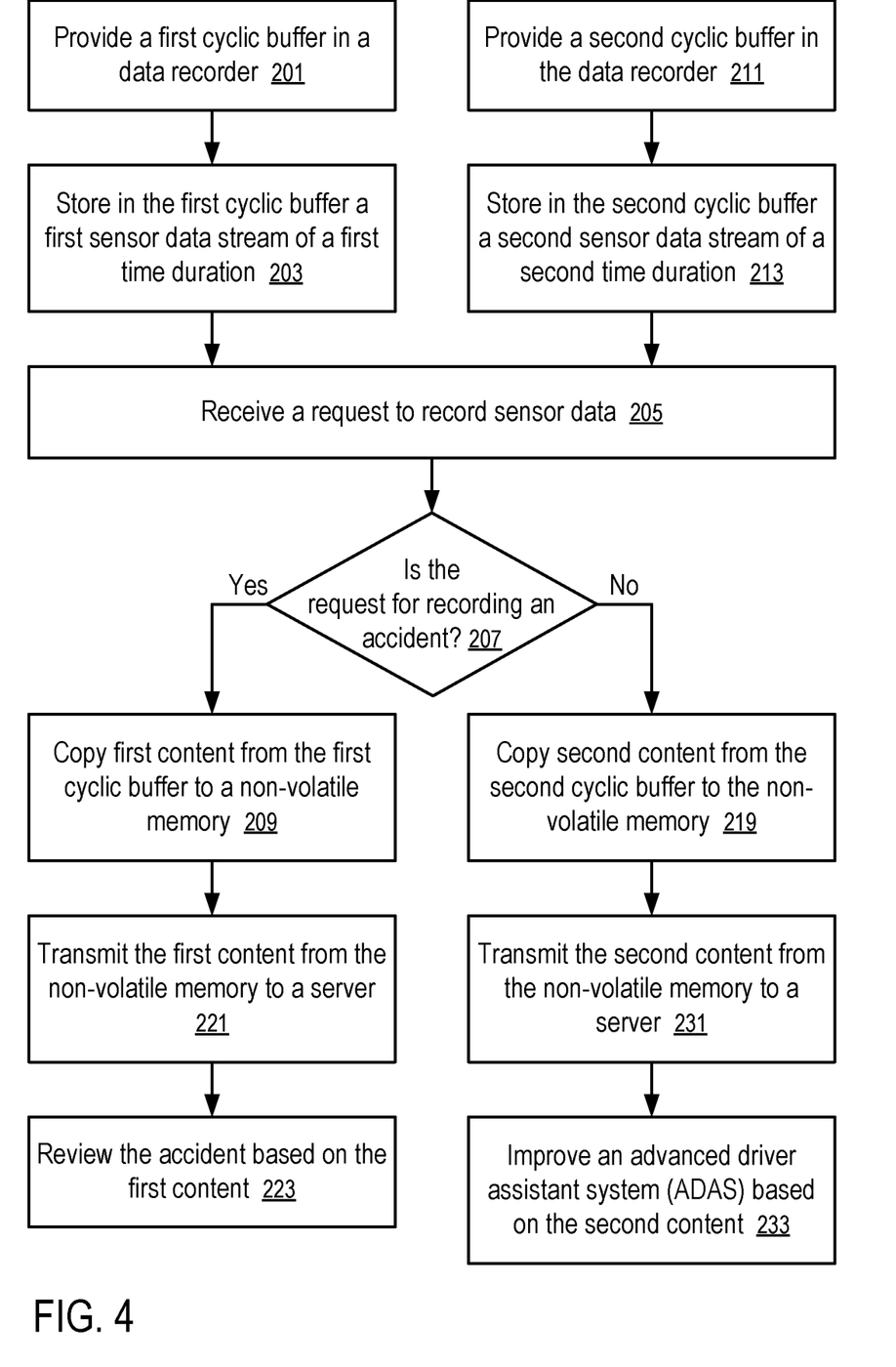
FIG. 4 shows a method of operating a data recorder according to one embodiment.

FIG. 4 shows a method of operating a data recorder according to one embodiment. For example, the method of FIG. 4 can be implemented in the data recorder (101) of FIG. 3 in the vehicle (111) of FIG. 2 in the system of FIG. 1.

At blocks 201 and 211, a data recorder (101) provides a first cyclic buffer (161) and a second cyclic buffer (163).

At block 203, the data recorder (101) buffers in the first cyclic buffer (161) a first sensor data stream of a first time duration (e.g., 30 seconds).

At block 213, the data recorder (101) buffers in the second cyclic buffer (163) a second sensor data stream of a second time duration (e.g., 3 minutes).

The first and second cyclic buffers (161 and 163) are operated in parallel. Data is buffered into each of the cyclic buffers (161 and 163) in a cyclic way such that when the buffer is full, the newest data is written over the oldest data. For example, data is recorded from the beginning of the buffer towards the end of the buffer. Once reaching the end of the buffer, data is again writing from the beginning of the buffer towards the end of the buffer, as if the end of the buffer follows the beginning of the buffer.

At block 205, the data recorder (101) receives a request to record sensor data. The request can be an accident signal or a training signal.

At block 207, the data recorder (101) determines whether the request is for recording an accident (e.g., a collision or near collision).

If the request is for recording an accident, at block 209 the data recorder (101) copies first content from the first cyclic buffer (161) to a non-volatile memory (165).

Optionally, the data recorder (101) stops, for a period of time, the buffering of incoming sensor data into the first cyclic buffer (161), as a response to the request to record an accident (e.g., to prevent overwritten existing data in the first cyclic buffer (161) and/or to preserve backup power when the external power supply to the data recorder (101) is interrupted).

At block 221, the data recorder (101) transmits or provides the first content from the non-volatile memory (165) to a server (119) after the accident.

At block 223, the server (119) reviews the accident based on the first content.

If the request is not recording an accident, at block 219 the data recorder (101) copies second content from the second cyclic buffer (163) to the non-volatile memory (165).

Optionally, the data recorder (101) continues, for a period of time, the buffering of incoming sensor data into the first cyclic buffer (161), as a response to the request and thus buffers the second content containing sensor data for a time duration that is partially before the request and partially after the request. After the period of continued buffering, the data recorder (101) may stop buffering for a further period of time before the completion of the copying of the second content into the non-volatile memory (165).

At block 231, the data recorder (101) transmits the second content from the non-volatile memory (165) to a server (119).

At block 233, the server (119) improves an advanced driver assistant system (ADAS) based on the second content.

Figure 5:
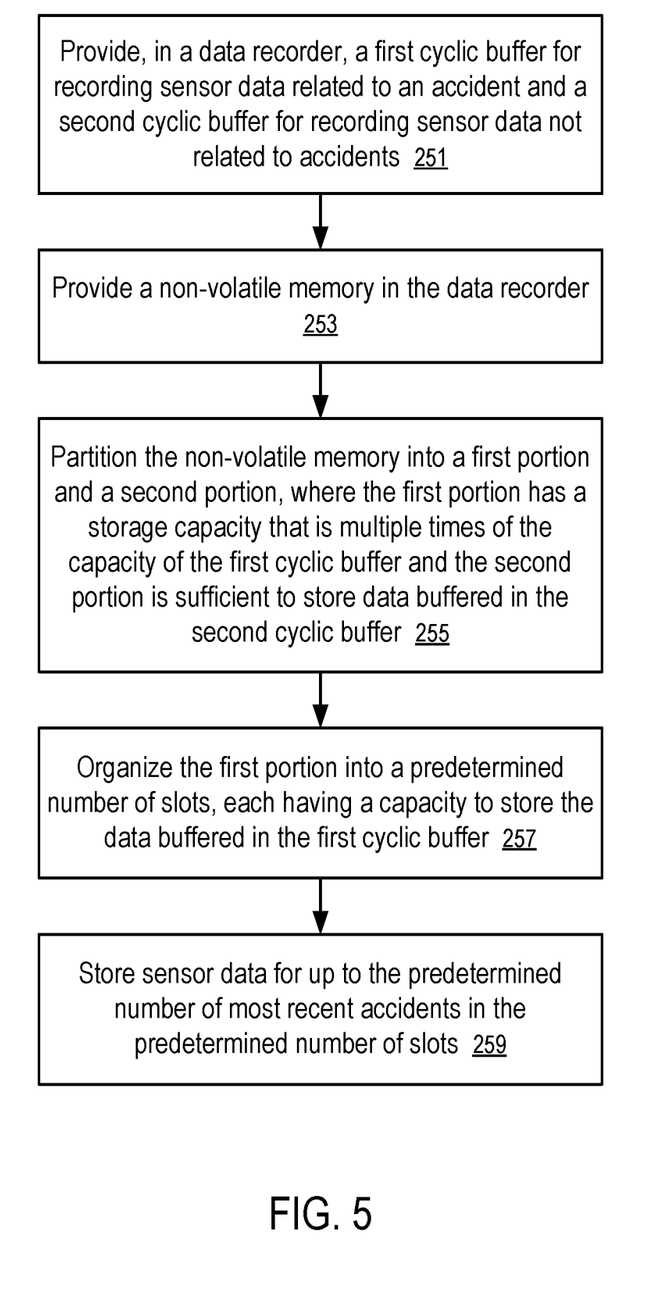
FIG. 5 shows another method of operating a data recorder according to one embodiment.

FIG. 5 shows another method of operating a data recorder according to one embodiment. For example, the method of FIG. 5 can be implemented in the data recorder (101) of FIG. 3 in the vehicle (111) of FIG. 2 in the system of FIG. 1. The method of FIG. 5 can be performed in combination with the method of FIG. 4.

At block 251, a data recorder (101) provides a first cyclic buffer (161) for buffering sensor data related to an accident and a second cyclic buffer (163) for buffering sensor data not related to accidents.

At block 253, a data recorder (101) provides a non-volatile memory (165).

At block 255, the data recorder (101) partitions the non-volatile memory (165) into a first portion (171, 173, . . . , 179) and a second portion (167), where the first portion has a storage capacity that is multiple times of the capacity of the first cyclic buffer (161) and the second portion is sufficient to store data buffered in the second cyclic buffer (163).

At block 257, the data recorder (101) organizes the first portion into a predetermined number of slots (171, 173, . . . , 179), each having a capacity to store the data buffered in the first cyclic buffer (161).

At block 259, the data recorder (101) stores sensor data for up to the predetermined number of most recent accidents in the predetermined number of slots (171, 173, . . . , 179).

For example, the data recorder (101) copies the accident sensor data from the accident data cyclic buffer (161) into the first slot (171) in response to an initial accident signal. For each subsequent accident signal, the data recorder (101) store the accident sensor data in the next slot (e.g., 173, . . . , 179). After reaching the last slot (179), the data recorder (101) uses the first slot (171) as the next slot, as if the first slot (171) is the next slot following the last slot (179).

Optionally, the second portion (167) reserved for the training sensor data buffered in the training data cyclic buffer (163) is also configured to have multiple slots. Each of the slot stores an indicator identifying the priority of the training sensor data stored in the respective slot. When the slots in the second portion (167) are full, the data recorder (101) reuses the slot having the lowest priority that is lower than the current training sensor data in the training data cyclic buffer (163).

In one example, an autonomous vehicle (111) has sensors (103) configured to generate a sensor data stream (151) during operations of the autonomous vehicle (111) on a road (102). An advanced driver assistance system (ADAS) (105) of the vehicle (111) can be configured to operate the vehicle autonomously (111) on the road (102) based on the sensor data stream (151). The advanced driver assistance system (ADAS) (105) is further configured to generate an accident signal (155) in response to detection or prediction of an accident and generate a training signal (157) in response to a fault in object detection, recognition, identification or classification.

A data recorder (101) of the vehicle (111) in the example includes a non-volatile memory (165), a first cyclic buffer (161), a second cyclic buffer (163), and a controller (159). The first cyclic buffer (161) has a capacity to buffer a first segment of the sensor data stream (151) (e.g., 30 seconds); and the second cyclic buffer has a capacity to buffer a second segment of the sensor data stream (151) (e.g., 3 minutes). In absence of the accident signal and the training signal, the first cyclic buffer (161) and the second cyclic buffer (163) are configured to buffer the sensor data stream (151) in parallel and cyclically within their respective capacities respectively. Before the generation of the accident signal (155) and the training signal (157), the sensor data stream segment buffered in the second cyclic buffer (163) can include the sensor data stream segment buffered in the first cyclic buffer (161).

In response to the accident signal (155), the controller (159) is configured to copy a sensor data stream segment from the first cyclic buffer (161) into the non-volatile memory (165). In response to the training signal (157), the controller (159) is configured to copy a sensor data stream segment from the second cyclic buffer (163) into the non-volatile memory (165).

The sensor data stream (151) from the sensors (103) can include outputs of the sensors (103), such as a digital camera, a radar, a lidar, or an ultrasound sonar, or any combination thereof. The advanced driver assistance system (ADAS) (105) can include a map (126) of the road (102) and an artificial neural network (125) for detecting, recognizing, identifying and/or classifying objects on the road (102) based on the sensor data stream (151). In response to a mismatch between the identification of an object in the map (126) of the road (102) and the identification of a corresponding object performed by applying the sensor data stream (151) in the artificial neural network (125), the advanced driver assistance system (ADAS) (105) can generate the training signal (155).

Preferably, after the training signal (157), the autonomous vehicle (111) is configured to automatically transmit the sensor data stream segment, copied into the non-volatile memory (165) responsive to the training signal (157), to a remote server (119). The server (119) can be configured with a training and updating module (123) to update the map (126) of the road (102) according to the sensor data stream segment received from the vehicle (111), and/or to update the artificial neural network (125) using a machine learning technique, such as a supervised machine learning technique.

In response to the accident signal (155), the segment of the sensor data stream (151), generated prior to the accident signal (155) and/or buffered in the first cyclic buffer (161) at the time of the accident signal (155), is copied into the non-volatile memory (165). Optionally, the controller (159) can stop the first cyclic buffer (161) from buffering an incoming segment of the sensor data stream (151), following immediately after the accident signal (155), to prevent the loss of a portion of the segment of the sensor data stream (151) that is in the first cyclic buffer (161) at the time of the accident signal (155), before at least a portion of the content copied from the first cyclic buffer (161) to the non-volatile memory (165).

Optionally, in response to the training signal (157), the segment of the sensor data stream (151), generated partially before the training signal (157) and partially after the training signal (157), is buffered in the second cyclic buffer (163) and copied into the non-volatile memory (165). For example, the controller (159) can continue to use the second cyclic buffer (163) to buffer a segment of the sensor data stream (151) that follows immediately after the training signal (157) to complete the buffering of the segment to be copied into the non-volatile memory (165). The controller (159) can then stop the second cyclic buffer (163) from buffering a further incoming segment of the sensor data stream (151), once the segment of the sensor data stream (151) to be copied into the non-volatile memory (165) is in the second cyclic buffer (163).

In some implementations, the accident data cyclic buffer (161) is not used. In response to an accident signal (155), the controller (159) copies a portion of the content of the training data cyclic buffer (163) corresponding to the segment that would be buffered in the accident data cyclic buffer (161) into a slot in the non-volatile memory (165). In other implementations, the training cyclic buffer (163) is not used. In response to a training signal (157), the controller (159) copies at least a portion of the content of the accident data cyclic buffer (161) corresponding to the segment that would be buffered in the training data cyclic buffer (163) into a slot (173) in the non-volatile memory (165), while directly storing a segment of the sensor data stream (151) following the training signal (155) into the area (167) of the non-volatile memory (165). A combination of the segment copied from the accident data cyclic buffer (161) into the corresponding slot (e.g., 173) and the segment saved directly into the area (167) provides the training sensor data corresponding to the training signal (157).

In some implementations, in response to the accident signal (155), the controller (159) may stop the operation of the training data cyclic buffer (163) to preserve power for copying data from the accident data cyclic buffer (161) to the non-volatile memory (e.g., 165) (e.g., in response to a detection of loss of external power supply to the data recorder (101)).

The first and second cyclic buffers (161 and 163) can be volatile memories (e.g., DRAM or SRAM); and the non-volatile memory (165) can include TLC/QLC NAND flash memory. The first and second cyclic buffers (161 and 163) may buffer a common segment of the sensor data stream (151) prior to receiving an accident signal (155) or a training signal (157).

Optionally, the controller (159) partitions the non-volatile memory (165) into a first area (171, 173, . . . , 179) and a second area (167). Further, the controller (159) organizes the first area (171, 173, . . . , 179) into a plurality of slots (171, 173, . . . , 179), where each slot (e.g., 171) has a storage capacity sufficient to store the entire content of the first cyclic buffer (161). A sensor data stream segment associated with and/or identified by a training signal (157) is copied into the second area (167); and a sensor data stream segment associated with and/or identified by an accident signal (155) is copied into one of the slots (171, 173, . . . , 179) in the first area. The controller (159) can use the slots according to a round robin scheme to maintain, in the slots (171, 173, . . . , 179), up to a predetermined number of accident sensor data stream segments associated with and/or identified by the most recent accident signals generated by the advanced driver assistance system (ADAS) (105) of the autonomous vehicle (111).

Optionally, the controller (159) can also organize the second area (167) of the non-volatile memory (165) into slots, where each slot has a storage capacity sufficient to store the entire content of the second cyclic buffer (163). The controller (159) can store (e.g., in the non-volatile memory or another memory) priority indicators of data stored in the slots. In response to the training signal (157), the controller (159) selects a slot from the slots in the second area (167), based on the priority indicators of the existing data in the slots in the second area (167) and a priority indicator associated with the training signal (157). The training sensor data is copied from the second cyclic buffer (163) into the selected slot in the second area (167).

The present disclosure includes methods and apparatuses which perform the methods described above, including data processing systems which perform these methods, and computer readable media containing instructions which when executed on data processing systems cause the systems to perform these methods.

The server (119), the computer system (131), and/or the data recorder (101) can each be implemented as one or more data processing systems.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An autonomous vehicle, comprising:
   sensors configured to generate a sensor data stream during operations of the autonomous vehicle on a road;
   an advanced driver assistance system configured to operate the autonomous vehicle on the road based on the sensor data stream, wherein the advanced driver assistance system is further configured to generate an accident signal in response to detection or prediction of an accident and generate a training signal in response to a fault in object detection, recognition, identification or classification;
   a non-volatile memory;
   a first cyclic buffer having a capacity to buffer first sensor data generated by the sensors up to a first period of time;
   a second cyclic buffer having a capacity to buffer second sensor data generated by the sensors up to a second period of time that is longer than the first period of time, wherein the first cyclic buffer and the second cyclic buffer are configured to buffer the sensor data stream in parallel and cyclically within the capacity of the first cyclic buffer and the capacity of the second cyclic buffers respectively in absence of the accident signal and the training signal; and
   a controller configured to copy the first sensor data from the first cyclic buffer into the non-volatile memory in response to the accident signal, and copy the second sensor data from the second cyclic buffer to the non-volatile memory in response to the training signal.

2. The autonomous vehicle of claim 1, wherein the sensors include a digital camera, a radar, a lidar, or an ultrasound sonar, or any combination thereof.

3. The autonomous vehicle of claim 2, wherein the advanced driver assistance system includes a map of the road and an artificial neural network; and the advanced driver assistance system is configured to generate the training signal in response to a mismatch between identification of an object in the map of the road and identification of a corresponding object via applying the sensor data stream in the artificial neural network.

4. The autonomous vehicle of claim 3, wherein after the training signal, the autonomous vehicle is configured to transmit the second sensor data from the non-volatile memory to a remote server that is configured to at least update the map of the road according to the second sensor data, the artificial neural network through machine learning using the second sensor data, or both the map and the artificial neural network.

5. The autonomous vehicle of claim 4, wherein the first sensor data is entirely generated by the sensors prior to the accident signal; and the second sensor data includes a first portion that is generated by the sensors prior to the training signal and a second portion that is generated by the sensors during a predetermined period of time after the training signal.

6. The autonomous vehicle of claim 5, wherein the controller is further configured to:
   stop, in response to the accident signal, buffering data from the sensor data stream into the first cyclic buffer before at least a portion of the first sensor data is copied from the first cyclic buffer into the non-volatile memory; and
   continue, for the predetermined period of time, buffering data from the sensor data stream into the second cyclic buffer before the controller stops buffering further data from the sensor data stream into the second cyclic buffer, in response to the training signal.

7. A data recorder of an autonomous vehicle, comprising:
a non-volatile memory;
a communication interface configured to receive a sensor data stream from sensors of the autonomous vehicle;
a first cyclic buffer having a capacity to buffer first sensor data from the sensor data stream, the first sensor data generated during a first period of time;
a second cyclic buffer having a capacity to buffer second sensor data from the sensor data stream, the second sensor data generated during a second period of time that is longer than the first period of time, wherein the first cyclic buffer and the second cyclic buffer are connected to the communication interface to perform buffering concurrently and in parallel; and
a controller configured to:
copy the first sensor data from the first cyclic buffer into the non-volatile memory in response to a signal of a first type; and
copy the second sensor data from the second cyclic buffer to the non-volatile memory in response to a signal of a second type.

8. The data recorder of claim 7, wherein signals of the first type indicate of accidents; and signals of the second type indicate training opportunities for an advanced driver assistance system of the vehicle.

9. The data recorder of claim 8, wherein in response to the signal of the first type, the controller is configured to stop buffering data from the sensor data stream into the first cyclic buffer before at least a portion of the first sensor data is copied from the first cyclic buffer into the non-volatile memory.

10. The data recorder of claim 9, wherein in response to the signal of the second type, the controller is configured to continue, for a predetermined period of time, buffering data from the sensor data stream into the second cyclic buffer before the controller stops buffering further data from the sensor data stream into the second cyclic buffer.

11. The data recorder of claim 10, wherein the first sensor data is entirely generated by the sensors prior to the signal of the first type; and the second sensor data includes a first portion that is generated by the sensors prior to the signal of the second type and a second portion that is generated by the sensors during the predetermined period of time after the signal of the second type.

12. The data recorder of claim 11, wherein the first and second cyclic buffers are volatile memories; and the non-volatile memory includes NAND flash memory.

13. The data recorder of claim 7, wherein both the first cyclic buffer and the second cyclic buffer are configured to buffer a common portion of the sensor data stream prior to receiving a signal of the first or second type.

14. The data recorder of claim 13, wherein the common portion is generated by the sensors during a same period of time.

15. A method, comprising:
receiving, in a data recorder of an autonomous vehicle, a sensor data stream generated by sensors of the autonomous vehicle during operations of the autonomous vehicle on a road;
buffering the sensor data stream into a first cyclic buffer of the data recorder and a second cyclic buffer of the data recorder in parallel and cyclically within a capacity of the first cyclic buffer and a capacity of the second cyclic buffer respectively, wherein:
the capacity of the first cyclic buffer is configured to buffer up to a first segment of the sensor data stream, the first segment generated by the sensors in a first period of time; and
the capacity of the second cyclic buffer is configured to buffer up to a second segment of the sensor data stream, the second segment generated by the sensors in a second period of time that is longer than the first period of time;
receiving, in the data recorder, an accident signal generated by an advanced driver assistance system detecting or predicting an accident;
copying, in response to the accident signal, the first segment of the sensor data stream from the first cyclic buffer into a non-volatile memory;
receiving, in the data recorder, a training signal generated by the advanced driver assistance system detecting a fault in object detection, recognition, identification or classification; and
copying, in response to the training signal, the second segment of the sensor data stream from the second cyclic buffer into the non-volatile memory.

16. The method of claim 15, further comprising:
generating, by the sensors including a digital camera, a radar, a lidar, or an ultrasound sonar, or any combination thereof, the sensor data stream.

17. The method of claim 16, wherein the fault includes a mismatch between an object identification provided in a map of the road and an object identification made through applying the sensor data stream in an artificial neural network of the advanced driver assistance system of the autonomous vehicle; and the method further comprises:
transmitting, after the training signal, the second segment of the sensor data stream from the non-volatile memory to a remote server;
updating, using the second segment of the sensor data stream, the map of the road, or the artificial neural network through machine learning, or both the map and the artificial neural network.

18. The method of claim 17, further comprising:
partitioning the non-volatile memory into a first area and a second area, wherein the second segment of the sensor data stream is copied into the second area in response to the training signal;
organizing the first area into a plurality of slots, each sufficient to store entire content of the first cyclic buffer; and
maintaining, in the slots, a plurality of data stream segments copied from the first cyclic buffer as responses to most recent accident signals generated by the advanced driver assistance system of the autonomous vehicle.

19. The method of claim 18, further comprising:
copying data from the first cyclic buffer into a slot selected from the plurality of slots according to a round robin scheme.

20. The method of claim 18, further comprising:
organizing the second area into a plurality of slots, each sufficient to store entire content of the second cyclic buffer;
storing priority indicators of data stored in the plurality of slots in the second area; and
selecting a selected slot from the plurality of slots in the second area in response to the training signal based on the priority indicators and a priority indicator associated with the training signal, wherein the second segment is copied from the second cyclic buffer into the selected slot in the second area.

\* \* \* \* \*